United States Patent [19]
Wendt

[11] Patent Number: 5,896,886
[45] Date of Patent: Apr. 27, 1999

[54] OIL FILTER WRENCH

[76] Inventor: Daniel F. Wendt, Osawatomie, Kans.

[21] Appl. No.: 09/130,110

[22] Filed: Aug. 6, 1998

[51] Int. Cl.$^6$ .......................... F01M 11/04; B25B 7/04; B67B 7/24; B67D 5/04

[52] U.S. Cl. .......................... 137/318; 7/100; 123/196 A; 123/196 R; 141/65; 141/98; 141/330; 184/1.5; 222/82

[58] Field of Search .......................... 137/15, 315, 318; 7/100, 132, 142, 158, 170; 81/2, 3.4, 3.44, 411, 414, 418, 424.5, 426.5; 141/65, 98, 329, 330, 346, 383; 30/443, 124; 123/196 R, 196 A; 184/1.5; 222/81, 82, 83, 83.5, 192, 5

[56] References Cited

U.S. PATENT DOCUMENTS

| | | | |
|---|---|---|---|
| 601,506 | 3/1898 | Eames | 81/411 |
| 2,779,224 | 1/1957 | Coggburn | 81/3.44 |
| 3,303,968 | 2/1967 | Compere | 222/83.5 |
| 3,395,724 | 8/1968 | Hamel | 137/318 |
| 3,698,419 | 10/1972 | Tura | 137/318 |
| 3,926,340 | 12/1975 | Tygenhof | 222/83.5 |
| 4,177,529 | 12/1979 | Sikula, Jr. | 7/100 |
| 4,852,769 | 8/1989 | Robertson et al. | 222/83.5 |
| 5,154,102 | 10/1992 | Becker | 81/3.48 |
| 5,291,914 | 3/1994 | Bares et al. | 137/15 |
| 5,299,714 | 4/1994 | Kilgore | 222/192 |
| 5,301,532 | 4/1994 | Bickmore et al. | 137/318 |
| 5,373,866 | 12/1994 | Whalen, II | 137/318 |
| 5,390,823 | 2/1995 | Kilgore | 222/81 |
| 5,398,718 | 3/1995 | Roinick, Sr. | 137/318 |
| 5,546,979 | 8/1996 | Clark, II et al. | 141/330 |
| 5,558,140 | 9/1996 | Clark, II | 141/330 |
| 5,560,269 | 10/1996 | Zelenka | 81/3.4 |
| 5,595,094 | 1/1997 | Negus | 81/3.44 |
| 5,704,383 | 1/1998 | Kammeraad et al. | 123/196 R |

*Primary Examiner*—George L. Walton
*Attorney, Agent, or Firm*—Joseph N. Breaux

[57] ABSTRACT

An oil filter wrench having adjustable serrated jaws that incorporate a hollow piercing jaw tooth that is connected to a drain hose via an internal oil channel through the oil filter wrench handle and jaw portion. The piercing jaw tooth includes an "O"-ring seal which seals when the piercing jaw punctures the oil filter housing. The drain hose includes a valve and a nipple that is attachable to a squeeze type drain bulb that can be used to provide a suction for sucking the oil filter during use. Use of the oil filter wrench allows the mechanic to drain the oil filter prior to removing the oil filter from its mount thereby preventing oil from draining onto the mechanic's hands and onto the vehicle parts.

3 Claims, 2 Drawing Sheets

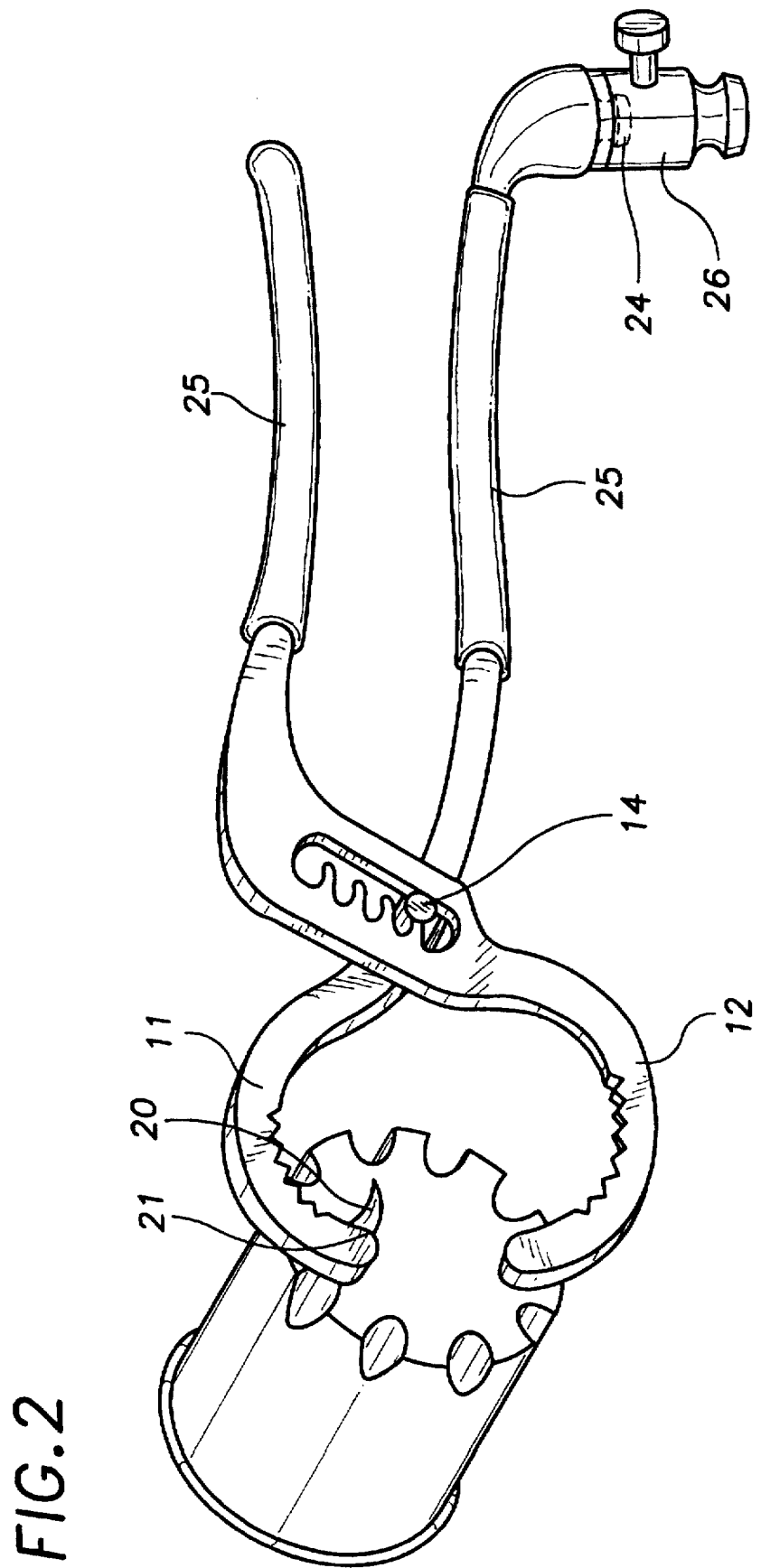

OIL FILTER WRENCH

DESCRIPTION

1. Technical Field

The present invention relates to devices and methods for oil filter wrenches and more particularly to devices and methods for an oil filter wrench that includes a piercing jaw tooth which includes an "O" ring seal so that when the piercing jaw punctures the oil filter housing, the "O" ring seals the pierced hole, while the piercing jaw and wrench handle includes a channel way for draining the oil from the oil filter through the wrench and to a collection pot.

2. Background Art

Removing oil filters from automobile engines and the like is a messy job because when the oil filter is rotated loose from its connection, residual oil in the filter spills out onto the mechanic's hands and parts of the vehicle. To overcome this problem the oil would have to be drained from the filter prior to removing it from the engine. The present invention provides a tool which allows the mechanic to puncture the outer oil filter housing and drain the interior of the oil filter prior to removing the oil filter from the engine thereby eliminating the mess associated with removing oil filters. The present invention accomplishes this and overcomes the problems by providing an oil filter wrench with adjustable serrated jaws that incorporates a hollow piercing jaw tooth that is connected to a drain hose via an internal oil flow channel. The piercing jaw tooth includes an "O"-ring seal which seals on the oil filter outer cover when it is punctured by the piercing jaw allowing oil to flow easily into the hollow piercing jaw tooth and into the internal oil channel through the wrench. A drain hose is provided for connecting to a handle portion of the wrench where the oil channel exits. The drain hose includes a valve and a nipple that is attachable to squeeze type drain bulb so that it can be used to provide suction for sucking the oil out of the oil filter before the oil filter is removed from the engine. Prior to the present invention there has never been an oil filter wrench as the present which overcomes the problem as set forth herein.

Prior art patents which are relevant are as follows:

Zelenka, U.S. Pat. No. 5,560,269 which discloses an oil filter wrench for use with a seized engine oil filter.

Rolinick, Sr., U.S. Pat. No. 5,398,718 which discloses tap line pliers for removing refrigerants from a line of a refrigeration system.

Kilgore, U.S. Pat. No. 5,390,823 which discloses a hand tool or filter punch for draining vehicular oil filters.

Whalen, II, U.S. Pat. No. 5,373,866 which discloses refrigerant discharge pliers for removing refrigerant from the lines of refrigeration systems.

Bares, et al, U.S. Pat. No. 5,291,914 which discloses a fluid recovery tool for forming an opening in a pipe.

Becker, U.S. Pat. No. 5,154,102 which discloses an oil filter removal tool which is attachable to a ratchet.

As can be seen from the prior art patents there have been no prior inventions which have overcome the problem that the inventor has with the present invention. As will be set forth herein this present invention overcomes the problems associated with oil filter removal which causes a mess when removing the oil filter from an engine.

GENERAL SUMMARY DISCUSSION OF INVENTION

It is thus an object of the invention to provide a Oil Filter Wrench that allows a mechanic to remove an oil filter from an engine without spilling oil on his hands and/or parts of the vehicle.

It is a further object of the invention to provide a Oil Filter Wrench that provides a means for draining the oil filter of residual oil prior to removing an oil filter from the engine.

It is a still further object of the invention to provide a Oil Filter Wrench that has adjustable serrated jaws that incorporate a hollow piercing jaw tooth that is connected to a drain hose via an internal oil channel. The piercing jaw tooth includes and "O" ring seal so as to seal the jaw when it punctures the oil filter housing. The drain hose includes a valve and a nipple that is attachable to a squeeze type drain bulb that can be used to provide a suction for sucking the oil out of the oil filter during use.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is an overall view of the oil filter wrench shown next to an oil filter.

EXEMPLARY MODE FOR CARRYING OUT THE INVENTION

It can be seen from the following description that in use one who is changing an oil filter would simply squeeze the oil filter wrench onto the filter housing of the oil filter causing the piercing jaw tooth to puncture the oil filter housing. Depending on the angle of the oil filter mounting the user would then rotate the oil filter wrench and filter allowing the punctured hole to be in the lower most position possible. If using the optional squeeze bulb, the user would then squeeze the bulb by inserting the end of the collection hose into the receptacle hole on the bulb and allow the bulb to expand thereby sucking oil out of the filter. If the bulb were not being utilized the user would place the end of the drain hose in a drain pan and let the filter drain out by gravity. The oil filter wrench would allow a majority of the oil to be drained from the filter prior to removal resulting in a much tidier oil change from start to finish. The use of the oil filter wrench would provide a very inexpensive and convenient method of changing the oil of an automobile without the mess. Additionally, the oil filter wrench can be used to remove seized oil filters.

Figure 1:
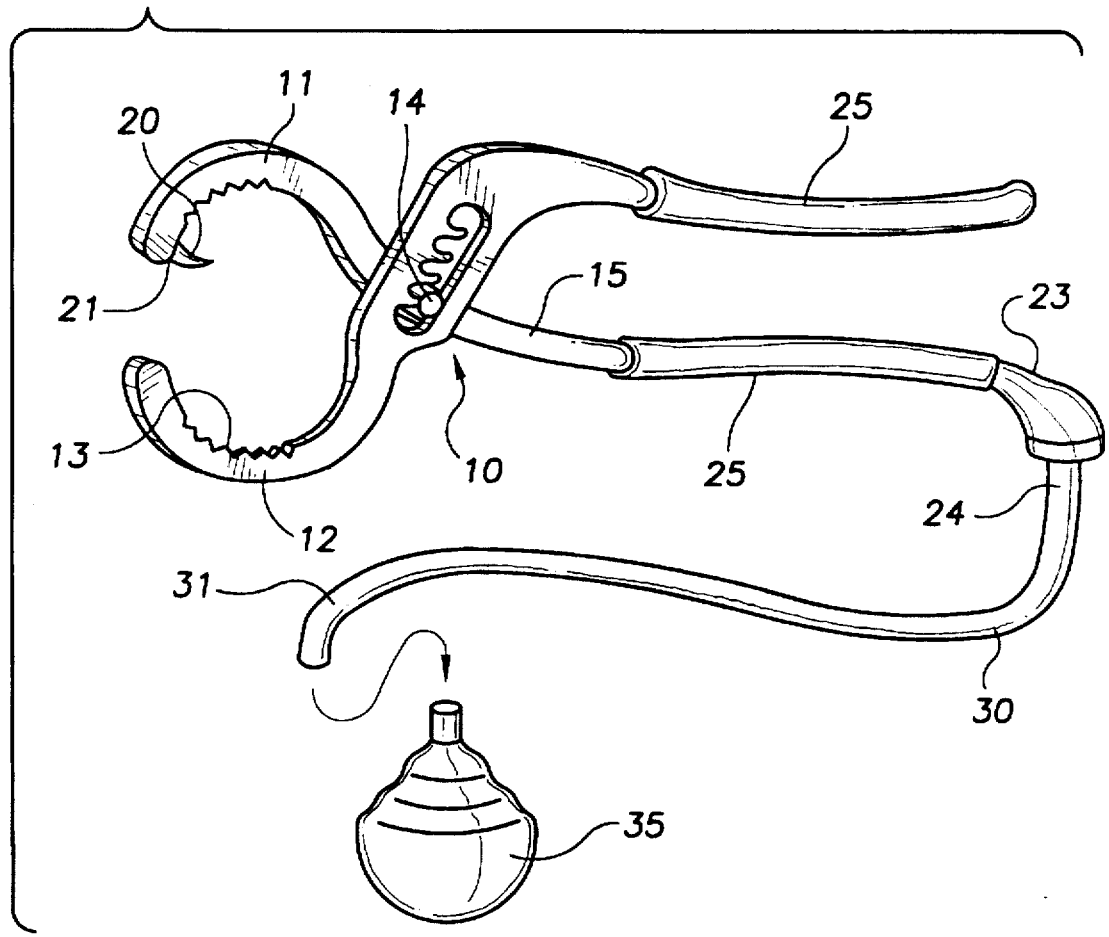
FIG. 1 is a general overall view of the oil filter wrench illustrating the piercing jaw, the slip joint adjustment, the rubber covered handles, the oil outlet collection tube, and the collection bulb.

Referring to the figures in detail, FIG. 1 is a general overall view of the oil filter wrench 10 which comprises two wrench halves 11 and 12 which are constructed similar to adjustable pliers and which have curved serrated jaws which are curved to match the outside curvature of a typical oil filter. The serrated jaws 13 provide an effective gripping means for gripping the oil filter outer surface. A slip joint adjustment 14 is provided to allow the wrench to be used for smaller or larger oil filter sizes as needed. One of the wrench halves includes an internal oil channel passage way 15 which extends through an interior portion of the wrench handle and through the wrench jaw section and to a piercing jaw 20. The piercing jaw 20 is a hardened and sharpened tubular piercing member which extends from an end portion of the serrated jaw portion. The piercing jaw 20 is preferably constructed of a hardened steel, while the wrench handles and jaws are likewise constructed. An "O" ring 21 is provided at a base of the piercing jaw for which seals on an outside surface of the oil filter when the piercing jaw penetrated the oil filter outer surface. Also at the base of the piercing jaw is an "O" ring seal groove which provides a backing for the oil ring to seal against when pushed to the bottom of the piercing jaw.

The handles of the wrench are preferably coated in a rubber material 25 which provides an effective gripping means for the wrench. The oil passage way 15 extends to an end portion of the wrench 23 where a nipple 24 is provided for attaching tubing 30. An option valve may be placed near the nipple end 24 which would allow a user to control the flow of oil from the wrench handle. The tubing is preferably four to about six feet long and once the wrench penetrating jaw is set in place, the end 31 of the tubing is placed in an oil drip pan for collection of the oil inside the oil filter. This method allows gravity to drain the oil filter. If desired a suction bulb 35 may be attached to the end 31 of the tubing thereby sucking the oil out of the oil filter.

Figure 3:
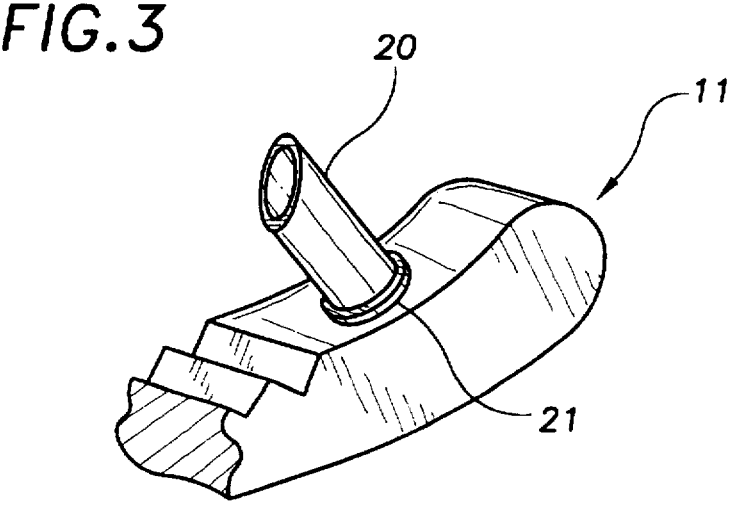
FIG. 3 is a close up isolated view of the serrated jaw with a single hollow piercing jaw tooth with "O" ring seal.

FIG. 3 is a close up isolated view of the piercing jaw with the "O" ring positioned around the base portion of the penetrating jaw demonstrating the location of the "O" ring seal. As can be seen, when a user initially user the wrench to pierce the outer cover of an oil filter, best results are achieved when the piercing jaw tooth is swiftly punctured through the filter outer surface and continued to seal on the oil filter outer cover. The continual motion, from puncture to "O" ring seal prevent oil from leaking from the oil filter before the seal is achieved. The wrench is also adaptable to use on seized oil filters since the piercing jaw tooth provides an effective anti-slip mechanism for gripping the oil filter.

It is noted that the embodiment of the Oil Filter Wrench described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Oil Filter Wrench useful for draining the oil from an oil filter prior to removing the oil filter from an engine thereby eliminating oil spillage when removing oil filters, the wrench comprising:
   a) a wrench with opposing adjustable serrated jaws, wherein the jaws are curved to contour to an outer curved surface of an oil filter, and handles extending from the serrated jaws
   b) a hollow piercing jaw tooth attached to an area near an end of one of the serrated jaws wherein the piercing jaw tooth has a sharpened hollow point directed towards the other serrated jaw and further orientated to align about perpendicular to an outer surface of an oil filter placed between the serrated jaws,
   c) an "O" ring seal around an outer portion of the piercing jaw tooth and an "O" ring sealing groove at a base of the piercing jaw tooth providing a surface for the "O" ring to form a seal when pushed to the base of the piercing jaw tooth,
   d) an oil channel extending from the hollow piercing jaw tooth internally through the serrated jaw and internally through the wrench handle to a nipple located at an end on one of the wrench handles, and
   e) tubing connecting to the nipple providing a means for draining the oil from the filter to a desired location.

2. The Oil Filter Wrench of claim 1, wherein the nipple connect at one end of the wrench further comprises a valve connected between the end of the wrench handle and nipple providing a means for controlling the flow of oil from the wrench handle when the tool is in use.

3. The Oil Filter Wrench of claim 1, wherein the wrench further comprises a squeeze bulb connected to an end of the tubing after the squeeze tube has been collapsed and after the piercing jaw has been punctured through an oil filter outer surface thereby providing a means for sucking oil from an interior of an oil filter prior to removing the oil filter.

* * * * *